United States Patent [19]

Lendaro

[11] Patent Number: 4,994,719

[45] Date of Patent: Feb. 19, 1991

[54] VOLTAGE REGULATOR WITH ACTIVE TURNOFF

[75] Inventor: Jeffery B. Lendaro, Noblesville, Ind.

[73] Assignee: RCA Licensing Corporation, Princeton, N.J.

[21] Appl. No.: 515,498

[22] Filed: Apr. 30, 1990

[51] Int. Cl.$^5$ ................... H01J 29/70; H04N 5/63
[52] U.S. Cl. ........................... 315/411; 358/190
[58] Field of Search .................. 315/411; 358/190, 242

[56] References Cited

U.S. PATENT DOCUMENTS 4,868,466 9/1989 Lendaro ..................... 315/411

Primary Examiner—Gregory C. Issing

Attorney, Agent, or Firm—Joseph S. Tripoli; Joseph J. Laks; Sammy S. Henig

[57] ABSTRACT

A base voltage of a regulator transistor is developed during normal operation in a filter capacitor coupled to a flyback transformer of a horizontal deflection circuit. After a transition to a standby mode of operation, the deflection circuit is disabled and the capacitor begins discharging. The emitter of the transistor is coupled to a load circuit. A supply voltage is coupled to the collector of the transistor during both standby and normal mode. To reduce the loading of a standby power supply that generates the collector voltage as along as the capacitor is not fully discharged, an active turnoff of the regulator transistor is provided immediately after the receiver goes into the standby mode of operation so as to actively turnoff the current drawn by the transistor.

7 Claims, 2 Drawing Sheets

VOLTAGE REGULATOR WITH ACTIVE TURNOFF

The present invention is directed to a voltage regulator circuit with an active turnoff capability. In particular, the present invention is directed to a circuit configuration in a signal processing portion of a television receiver in which voltage regulation is necessary to supply sufficient power to circuit elements with tight voltage tolerances and where it is important to maintain a voltage to a control unit while in a standby mode of operation.

It is known to provide a television receiver which is capable of operation in a plurality of modes. Among the known modes are an OFF mode, a standby mode, and a normal mode. In the normal mode, the television receiver operates to process video and audio signals and display and amplify those signals. In this mode, the signal processing and other functions can be controlled by various control circuit elements including a microprocessor. In the standby mode the television is in a ready condition but there is no video or audio signal processing being performed. In this mode, the microprocessor is powered and set for operation but the receiver does not process any audio or video signals.

In a switch mode power supply, embodying an aspect of the invention, a switch mode power supply regulator acts to regulate a supply voltage that is referenced to a "cold" ground conductor, at a secondary side of an isolation barrier formed by a chopper transformer. Regulation of such supply voltage is obtained by sensing a voltage that is developed at the secondary side, during the normal mode. On the other hand, during the standby mode, regulation of such voltage is obtained by sensing a voltage that is referenced to a "hot" ground conductor, at a primary side of the isolation barrier formed by the chopper transformer.

There may be, for example, two voltages produced at the secondary side of the transformer, during both the normal operation and standby mode, a first voltage V1 of approximately 15 volts, and a second voltage B+ of approximately 145 volts. Voltage B+ is sensed during the normal mode. Voltage V1 tracks the voltage B+ due to the cross coupling of the transformer secondaries.

In the normal mode, the switch mode regulator is controlled by a horizontal rate pulse width modulated signal derived from a horizontal deflection rate signal developed at a secondary winding of a horizontal flyback transformer. In the standby mode, there is no horizontal deflection; consequently, the switch mode regulator cannot be controlled by the horizontal rate signal. Instead, the switch mode regulator senses a voltage developed at a winding of the transformer that is at the primary side of the transformer.

The selection of either the standby mode or the normal mode of operation is indicated to a switch mode power supply control circuit, that is at the primary side of the regulator, and that is referred to herein as the switch mode power supply primary circuit of the regulator, by the absence or presence, respectively, of the horizontal line pulse width modulator (PWM) which is coupled to the primary circuit via an isolation transformer. When horizontal line rate pulses are received by the primary circuit, this indicates the normal mode of operation. In the normal mode of operation, the output pulses of the pulse width modulator are pulses at the horizontal rate with a variable pulse width depending on the level of the sensed B+ voltage. The switch mode regulator primary circuit produces an output signal controlled in accordance with the duty cycle of the pulse-width modulated signal to control the state of a chopper transistor coupled to a primary winding of the transformer, at the primary side. In particular, the output signal that is developed at a control terminal of the chopper transistor is determined by the pulse width of the signal produced by the PWM and received at the primary circuit input terminal. If the chopper transistor current exceeds a predetermined value, typically protective circuits that are provided in the primary circuit causes the shutdown the chopper output transistor. In the standby mode, the pulse width modulated signal is not generated, and the primary circuit detects such condition by the absence of such signal and operates to regulate from the primary side.

In the standby mode, however, voltage V1 that is at the secondary side is only loosely coupled to the primary circuit at the primary side of the transformer because of the loose coupling in the chopper transformer. Therefore, voltage V1 is not a tightly regulated as in the normal mode. The voltage V1 is utilized as a low voltage supply for various loads in the circuitry at the secondary side of the transformer during both the standby and normal modes. Voltage B+ is utilized to provide power to the horizontal output circuitry. It is thus coupled to the horizontal flyback transformer, which has secondary windings for producing other low voltages, that are developed in filter capacitors during the normal mode but are not developed during the standby mode. Voltage V1 is coupled to energize a remote control receiver which can be operated by a user of the television from a remote location.

When the remote control receiver operates to place the receiver in the standby mode, these low voltages produced by the flyback transformer, may not decay quickly despite the absence of horizontal line rate signals from the flyback transformer because of the charge on the capacitors. Therefore, these low voltages will decay over a transition interval defined by an RC time constant associated with the capacitors and resistive circuitry.

One of such low voltages that is produced by the flyback transformer is coupled to a base of a regulator transistor for developing the base voltage at the required level. The collector of such transistor is energized by voltage V1 during both normal and standby mode. A regulated output supply voltage is developed at the emitter of the regulator transistor that energizes stages during the normal mode but not during the standby mode. Therefore, as long as the low voltage that is produced by the flyback transformer has not decayed, current will be drawn from voltage V1 supply, causing heavier loads on the chopper transformer. Due to the absence of horizontal line rate signals in the standby mode, the primary regulator circuit regulates from the primary side of the transformer. Since regulation is not as accurate in the standby mode, as in the normal mode, due to the loose coupling in the chopper transformer, it may be desirable to remove all unnecessary loads from the voltage V1 supply in order not to cause a transient condition in voltage V1. The transient condition could adversely affect circuitry such as the control microprocessor of the remote control receiver.

In accordance with an aspect of the invention, an active turnoff of the regulator transistor is provided immediately after the receiver goes into the standby mode of operation so as to actively turnoff the load of voltage V1 supply to provide for better regulation on the transformer primary side in the standby mode due to the immediate reduction of the load current. This reduction in the load current in the standby mode maintains a safe voltage level to the remote control receiver circuits which need to remain operational during the standby mode of the receiver.

A power supply, embodying an aspect of the invention, of a video display apparatus includes a source of an on/off control signal that is indicative when operation in a run or normal mode is required and when operation in a standby mode is required. A power supply regulator generates a first supply voltage at a first supply terminal, during both the standby and the run mode. A transistor has a first main current conducting terminal that is coupled to the first supply voltage and a second main current conducting terminal that is coupled to a load circuit. A deflection circuit output stage responsive to the on/off control signal generates a second voltage, during the run mode, and during a transition interval that follows the run mode operation. A third voltage is generated at the control terminal of the transistor at a first magnitude, in accordance with second voltage, during the run mode, to enable the transistor to produce a load current, and at a second magnitude, during the transition interval, for actively disabling the transistor during the transition interval.

Figure 1A:
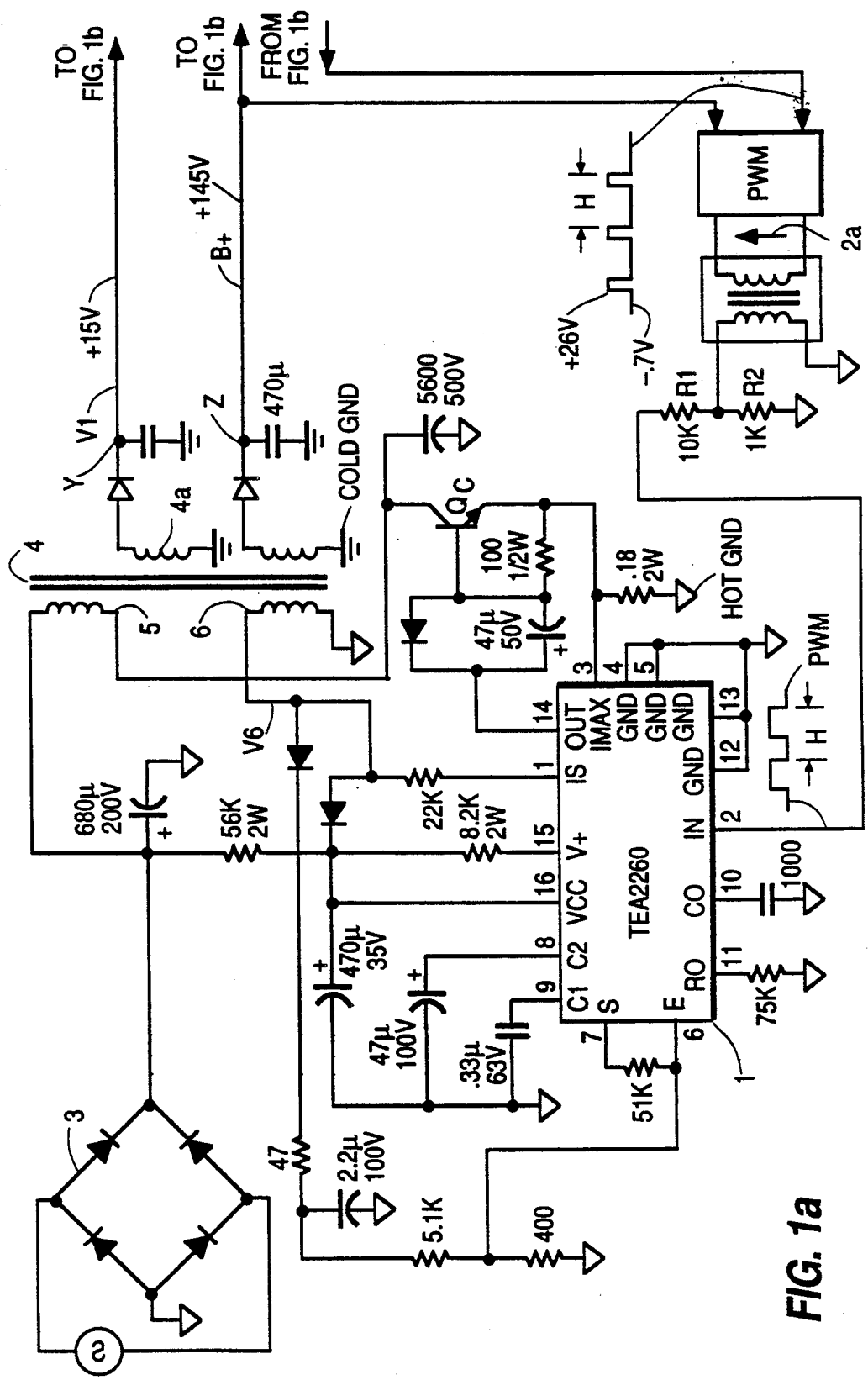
FIG. 1(a) illustrates a first portion of a television receiver power supply circuit coupled to a load circuit of the receiver in accordance with an embodiment of the present invention.
Figure 1B:
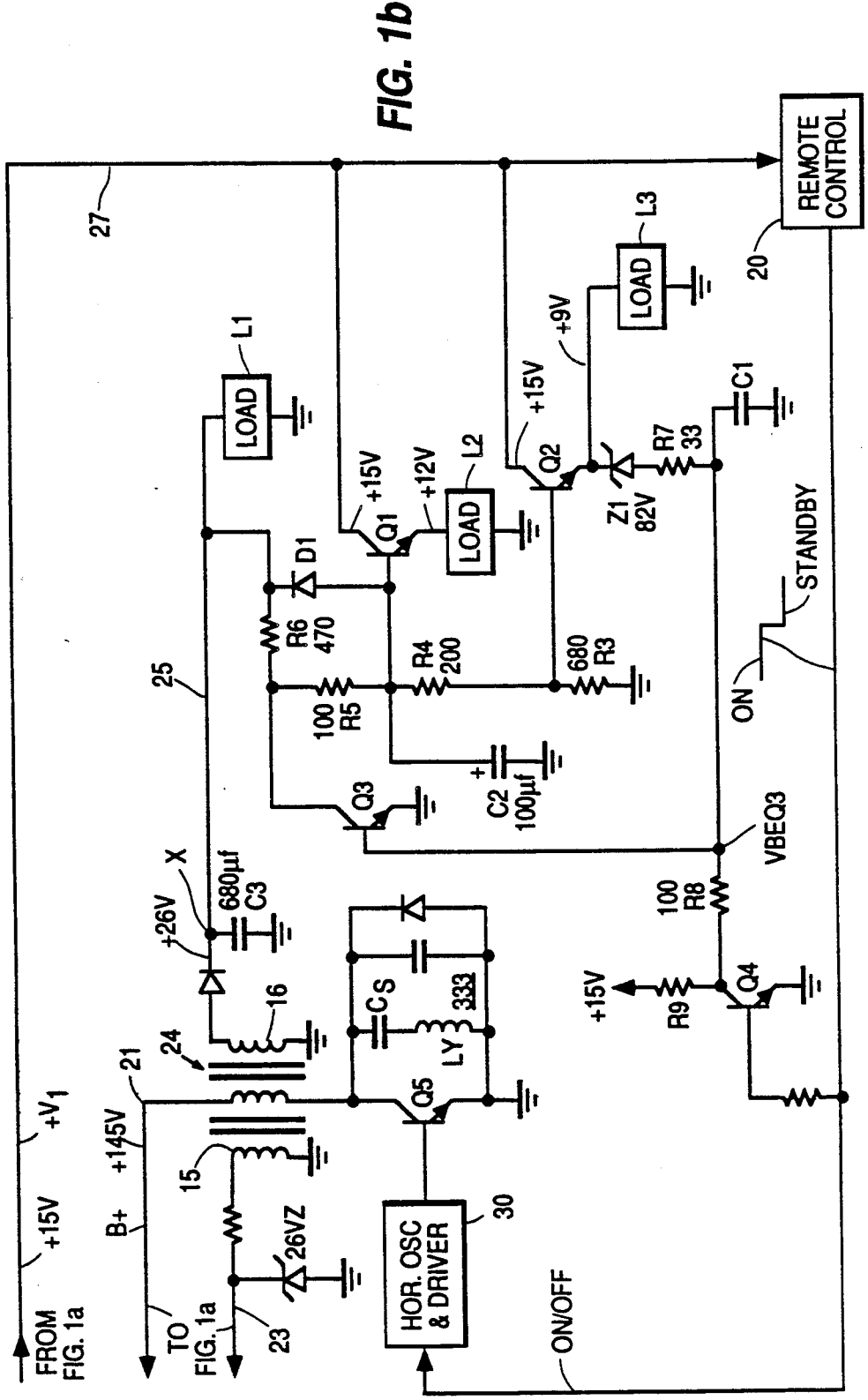
FIG. 1(b) illustrates the load or secondary circuit of a television receiver utilizing an embodiment of the present invention.

FIG. 1(a) illustrates a power supply of a television receiver. The receiver circuitry includes a conventional rectifier bridge 3 supplying DC power to a primary 5 of a chopper transformer 4. The primary 5 of the transformer is coupled to a main chopper transistor QC that is controlled by an output signal of a control circuit, referred to herein as a primary circuit 1, to form a switch mode regulator. A winding 6 of the transformer 4 that is referenced to a "hot" ground provides a sensing voltage V6 for primary side regulation in a standby mode of the receiver.

A known primary circuit 1 is a type TEA2260 made by SGS Thomson. Pin 2 of the primary circuit 1 is coupled to receive an output signal 2a of a pulse width modulator (PWM) 2 through an isolation transformer 3 and resistors R1 and R2. During run or normal mode, the output of the pulse width modulator comprises pulses at the horizontal line rate. When such pulses are received at pin 2 of primary circuit 1, the primary circuit operates in the run or normal mode of operation. In that mode of operation, a voltage B+ at a terminal z of approximately 145 volts and a voltage V1 at a terminal y of approximately 15 volts are produced and regulated by sensing voltage B+ at the secondary side of transformer 4. The pulse width of the pulses from the pulse width modulator control the power supply regulation, i.e. the duty cycle of chopper transistor QC, during the run mode.

In the standby mode, when no such pulses are received at pin 2, the voltage, B+ and V1, are regulated by the primary circuit 1 from voltage V6 at the primary side. Should a current drain at terminal z be excessive in standby, the voltage V1 will not be regulated in the standby mode properly as in the normal mode, because the primary windings 5 and 6 are only loosely coupled, via the main transformer 4, to a winding 4a at the secondary side of the transformer 4 from which voltage V1 is developed. The primary circuit 1 then controls or regulates from the "hot" side or the primary side of transformer 4 by sensing the voltage at winding 6.

In the normal mode of operation, PWM 2 senses the 145V B+ supply in order to regulate the B+ and +V1 supplies. The PWM 2 also receives a horizontal line rate signal produced by a secondary 15 of the horizontal output transformer. These horizontal line rate pulses are switchably processed, typically by an integration network, to produce a ramp voltage which is used for generating the pulse width modulated output pulses of PWM 2. The pulse width modulated output pulses of PWM 2 are then supplied to the primary circuit 1 and then to control chopper transistor QC in order to regulate the B+ supply and, due to the close tracking, the V1 supply.

In the standby mode, the horizontal line rate signals from secondary 15 are not generated because a horizontal deflection circuitry 333 is disabled. Instead, the primary circuit 1 regulates voltage V1 by sensing voltage V6 at the primary side. As explained previously, such regulation is not as accurate as the secondary side regulation, provided by PWM 2. Accordingly, in order to keep the V1 voltage which energizes the remote control circuitry of the receiver regulated, it is desirable to deactivate or remove unnecessary loads that are not required for the standby mode operation from the supply voltage V1, as quickly as possible after a transition from the normal to the standby mode of circuit 1. This includes, for example, all the video and audio processing circuitry.

Voltage V1 is coupled to a remote control receiver 20 which can include a microprocessor, and is also coupled to a collector of a power transistor Q2 and to a collector of a power transistor Q1. These two latter transistors are coupled at their emitters to loads to be driven during the normal mode of operation of the receiver but not during standby. As described above, in both the standby mode and the normal mode voltage V1 is approximately 15 volts.

It may be desirable to provide controlled or regulated voltages to the loads of transistors Q1 and Q2 respectively. Furthermore, it may be desirable to provide a supply of regulated voltage to the remote control processor though primary side regulation of primary circuit 1, during the standby mode, so that the processor operates properly.

In the normal mode of operation, the remote control receiver provides an ON signal to a Horizontal Oscillator and Driver 30 which supplies horizontal drive pulses to the base of a horizontal deflection output transistor Q5. The horizontal deflection output transistor Q5 produces horizontal rate pulses in secondary 15, which are coupled to the pulse width modulator, PWM 2, of FIG. 1(a) as described above. Furthermore, the horizontal output or flyback transformer 24 develops a voltage of approximately 26 volts at a terminal x of a conductor 25, across a filter capacitor C3. The 26 volt supply is used to energize a first television receiver load L1 such as a vertical deflection output stage, not shown. In addition, the +26 volt supply at terminal x is coupled to the collector or transistor Q3 through a resistor R6. The junction between the collector of transistor Q3 and resistor R6 is coupled via a voltage divider network of resistors R3, R4 and R5 to the bases of transistor Q2 and of transistor Q1. As a result, a voltage that is developed at a first junction terminal between resistors R4 and R5, and a voltage that is developed at a second junction terminal between resistors R4 and R3 are applied to the base of transistor Q1 and to the base of transistor Q2, respectively. The 15 volt supply voltage V1 from the main chopper transformer 4 is supplied to the collectors of power transistors Q1 and Q2.

When, during normal mode, these transistors Q1 and Q2 are ON, +9V and +12V regulated voltages developed at the corresponding emitters of the transistors produce currents that flow in the respective loads L2 and L3. The emitter voltage +12V of transistor Q1 is regulated to approximately 12 volts and the emitter voltage of transistor Q2 is regulated to approximately 9 volts.

The voltage +9V at load L3 is regulated in the following manner. A zener diode Z1 is coupled to the emitter of transistor Q2. A resistor R7 is coupled between diode Z1 and the base of a feedback amplifier transistor Q3. The collector of transistor Q3 is coupled to collector load resistor R6 and to the base of transistor Q1. In the normal mode, the ON signal produced by the remote control receiver turns ON transistor Q4 thereby coupling a resistor R8 between the base of transistor Q3 and ground. Therefore, in the normal mode, a negative feedback loop is formed and the emitter voltage of transistor Q2 is regulated to be at 9 volts. Consequently, the power transistors Q1 and Q2 operate normally to regulate the two load voltages supplied to loads L2 and L3. Zener diode Z1 level shifts the emitter voltage of transistor Q2 so that it regulates in a negative feedback manner to approximately 9 volts. When the receiver is in the ON or normal mode, the base voltage of transistor Q1 is developed across resistors R4 and R3.

In the normal mode, the emitter of transistor voltage Q2 is regulated to the level:

$$VZ1 + VBEQ3 (R7+R8)/R8$$

In the above formula, the base-emitter voltage of transistor Q3 is referred to as VBEQ3 and the zener voltage as VZ1.

The emitter of transistor Q2 is regulated to 9 volts with zener diode Z of VZ1=8.2V. Therefore, the base of Q2 will be 9+VBEQ2. The base-emitter voltage of transistor Q2 is referred to as VBEQ2. The current through resistors R4 and R3 is made large compared to the base current in transistor Q2. Therefore, the voltage at the base of transistor Q1 is approximately 9.6(R3+R4)/R3 or approximately 12.7 volts in the embodiment shown. The emitter voltage of transistor Q1 is thus regulated to approximately 12.1 volts. Transistors Q1 and Q2 are, illustratively, of the same type and are operated at the same temperature. Therefore, good voltage tracking can be achieved. Thus, the voltages across loads L2 and L3 are maintained at 12 volts and 9 volts respectively. Zener diode Z1 and resistor R7 provide voltage regulation of the lower voltage, +9V, which in turn regulates the higher voltage, +12V, and provides voltage regulation for the receiver loads powered from the secondary side of the transformer 4.

When the remote control receiver indicates a change from the normal mode to the standby mode, the remote control receiver generates an OFF or standby signal to the base of transistor Q4 and to the horizontal oscillator and driver stage 30. This prevents deflection output transistor Q5 from switching, thereby preventing the voltages at the flyback secondaries 15 and 16 from being produced. Accordingly, PWM 2 ceases to provide PWM signal 2a to primary circuit 1 and the switch mode regulator regulates from the primary side in accordance with voltage V6. As discussed, to maintain adequate regulation of the 15V supply voltage V1, it may be desirable to disable the current drain by the loads L2 and L3 from the voltage V1 supply as quickly as possible after the remote control receiver generates the OFF signal, because loads L2 and L3 are powered by the transformer 4.

These loads can still draw current as long as filter capacitors C2 and C3, coupled to the base of transistors Q1 and Q2, that are charged during the normal mode, are still not discharge. If capacitors C2 and C3 do not discharge rapidly enough they will provide sufficient voltage at the base of transistor Q1 and of transistor Q2 to maintain transistor Q1 and transistor Q2 conductive. It may be desirable to actively turn off load transistors Q1 and Q2 so that they are turned off as quickly as possible. As discussed, in the standby mode of operation voltage V1 may not be regulated so well because secondary winding 16 at the secondary side is not as tightly coupled to the primary winding 6 of the transformer 4, during primary side regulation in standby. Therefore, if transistors Q1 and Q2 were to continue to draw current from winding 4a through line 27 due to a delay in turn-off of transistors Q1 and Q2, the voltage level applied to the remote control receiver 20 that may include a control microprocessor, might drop below the minimum required level. Such drop in voltage V1 might occur during a transition interval immediately after the transition to standby mode in the output signal of remote receiver 20 and in the primary circuit.

The present invention provides an active turnoff of transistors Q1 and Q2 which counteracts a possible delay due to a slow decay of the 26 volts at point X of line 25, during the transition interval immediately after the transition to the standby mode. In particular, when the remote control receiver 20 generates its on/off control signal at the OFF or standby state, transistor Q4 is turned off. Therefore, the 15 volt source that is coupled to the collector of transistor Q4 through resistor R9 drives transistor Q3 ON such that transistor Q3 is in saturation. Transistor Q3 in saturation actively drives the base voltage of each of transistors Q1 and Q2 to approximately zero volts. As a result, transistors Q1 and Q2 are turned off quickly, thereby, advantageously, removing loads L1 and L2 from the 15 volt supply. The voltage across capacitor C2, which results from charging of the capacitor during the normal mode of operation, is discharged quickly through the transistor Q3.

A diode D1 may be coupled between the base of transistor Q1 and terminal x. Diode D1 is provided between the connection point of the load L1 and the base of Q1 and accordingly capacitor 2. Diode D1 that bypasses resistors R5 and R6 allows capacitor 2 to be discharged more quickly through load L1 when the +26 volt voltage decays fast enough.

Accordingly, there has been described a low voltage regulator circuit which is capable of switching a nonessential load connected thereto out of the circuit in order to conserve power when the television receiver switched to the standby mode of operation and regulation is more difficult to achieve.

A regulator circuit has also been described wherein a lower voltage supply controls the regulation of a higher voltage supply.

What is claimed is:

1. A power supply of a video display apparatus, comprising:

a source of an on/off control signal that is indicative when operation in a run mode is required and when operation in a standby mode is required;

means for generating a first supply voltage at a first supply terminal, during both said standby and said run mode;

a transistor having a first main current conducting terminal that is coupled to said first supply voltage and a second main current conducting terminal that is coupled to a load circuit;

a deflection circuit output stage responsive to said on/off control signal for generating a second voltage, during said run mode and during a transition interval that follows said run mode, said transition interval occurring after a change in said control signal occurs to becoming indicative that said standby mode operation is required; and means responsive to said on/off control signal and to said second voltage and coupled to a control terminal of said transistor for generating a third voltage at said control terminal at a first magnitude, in accordance with said second voltage, for enabling said transistor to produce a load current in said load circuit, during said run mode, and for generating said third voltage at said control terminal at a second magnitude for actively disabling said transistor from producing said load current to prevent said second voltage that occurs during said transition interval from enabling said transistor.

2. A power supply according to claim 1 wherein said load current flows via said first supply terminal when said transistor is enabled.

3. A power supply according to claim 1 wherein said deflection circuit output stage generates an output signal at a frequency that is related to a deflection frequency during said run mode but not during said transition interval and wherein said first supply voltage generating means comprises a power supply regulator responsive to said output signal of said deflection circuit output stage for regulating said first supply voltage in accordance therewith when said output signal of said deflection circuit output stage is generated.

4. A power supply according to claim 3 further comprising a pulse width modulator responsive to said output signal of said deflection circuit output stage and to said first supply voltage for generating an output signal at a frequency that is related to said deflection frequency that is coupled to said power supply regulator for regulating said first supply voltage in accordance with said output signal of said pulse width modulator and wherein when said output signal of said deflection circuit output stage is not generated said first supply voltage is coupled to said regulator to provide negative feedback via a corresponding signal path that does not include said output signal of said deflection circuit output stage.

5. A power supply according to claim 1 wherein said transistor is disabled for decoupling said load circuit from said power supply regulator when said output signal of said deflection circuit output stage is not generated.

6. A power supply according to claim 1 wherein said transistor is included in a voltage regulator for regulating a supply voltage at said second main current conducting terminal.

7. A power supply according to claim 1 wherein a transistor disabling means comprises a switch that is coupled to said control terminal for decoupling said deflection circuit output stage from said control electrode, during said transition interval.

* * * * *